UNITED STATES PATENT OFFICE.

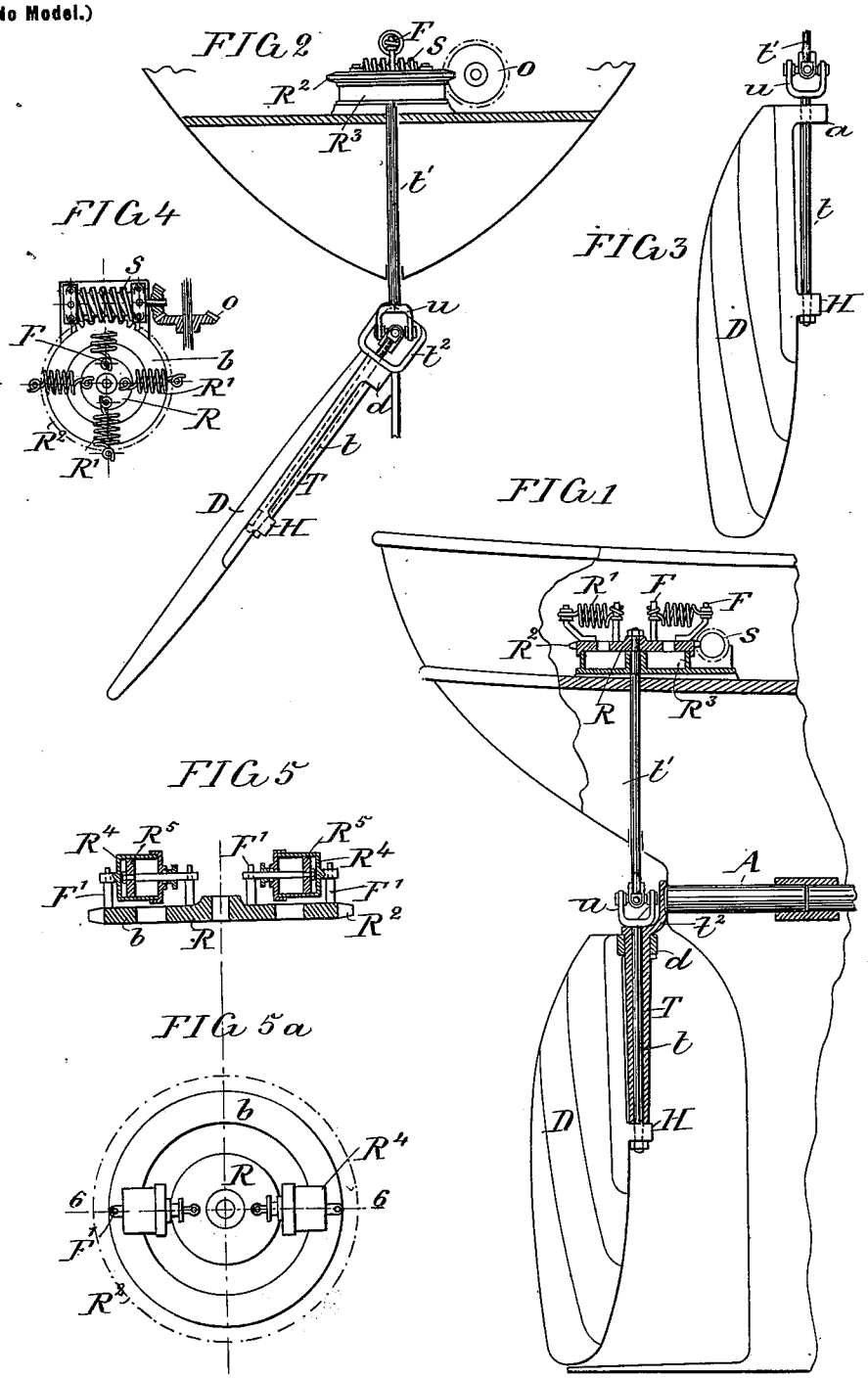

HENRIC CHRISTIAN VOGT, OF COPENHAGEN, DENMARK.

APPARATUS FOR PROPELLING AND STEERING VESSELS.

SPECIFICATION forming part of Letters Patent No. 675,178, dated May 28, 1901.

Application filed February 11, 1901. Serial No. 46,910. (No model.)

*To all whom it may concern:*

Be it known that I, HENRIC CHRISTIAN VOGT, a subject of the King of Denmark, residing at Copenhagen, Denmark, have invented Improvements in Apparatus for Propelling, Steering, and Maneuvering Navigable Vessels, of which the following is a specification.

This invention relates to the kind of apparatus for propelling, steering, and maneuvering navigable vessels referred to in the specification of British Letters Patent previously granted to me and numbered 12,509 of 1894, in which the propulsion, the steering, and the maneuvering of a vessel are all effected by means of a rudder whose head is formed as a shaft and mounted in a tube fixed perpendicularly, or approximately so, to an oscillatory driving-shaft and is connected at its upper end through a spring or springs to a steering and maneuvering device, so that the oscillation of the driving-shaft and the consequent pressure of the water on the oscillating rudder cause it to execute movements similar to those of the tail of a fish and compounded of oscillations about the axis of the said driving-shaft and oscillations about the common axis of the tube and the rudder-head, while the mean position of the oscillating rudder in relation to the said tube can, by means of the said steering and maneuvering device, be fixed or varied as required in order to fix or change the direction of motion of the vessel.

Now this invention has for its object to adapt such apparatus for use in a steam vessel of ordinary construction and to be mounted therein with the rudder in a position under the stern similar to that ordinarily occupied by a screw-propeller. According thereto the upper end of the rudder-head, formed as a shaft, is connected by a universal joint having its center in the axis of the driving-shaft, with a steering and maneuvering shaft whose upper end is connected to springs tending to prevent the rotation of the said steering and maneuvering shaft about its own axis in both directions, so as to be put under stress by the pressure of the water on the rudder-blade on the oscillation thereof, and thereby to limit such oscillation.

Figures 1 and 2 of the accompanying drawings are respectively a longitudinal section and a broken cross-section of a vessel provided with an example of apparatus according to this invention, while Fig. 3 is an elevation of the rudder-blade and its head, with universal joint. Fig. 4 is a somewhat diagrammatic and broken plan of means employed for turning the steering and maneuvering shaft, and Figs. 5 and 5ª are respectively a vertical section and a plan of a modification of the means shown in Fig. 4.

The rudder-head $t$ instead of extending upward beyond the driving-shaft A and having the spring or springs secured to its upper oscillating end, as set forth in the aforesaid specification, terminates at the driving-shaft A and is connected with a vertical shaft $t'$, having a stationary axis, by means of a universal joint $u$, whose center is in the axis of the driving-shaft A. The upper end of the shaft $t'$ has fixed to it a disk or wheel R, (shown in plan in Fig. 4,) which is connected by radial helical steel springs R' with a ring $R^2$, which is mounted on and kept down by means of catches (not shown) to a support $R^3$, Fig. 1, on which it can be turned by means of a worm S, driven by bevel-wheels O and engaging with teeth formed on the ring $R^2$, the worm S being of such a pitch as to secure the ring $R^2$ in any position into which it may have been turned. The springs R' form eyes at their ends, which are placed over pivots F, extending upward from the wheel R and the ring $R^2$, so that the springs can be easily removed and new ones substituted therefor when required. It will be seen that the connection between the wheel R and the ring $R^2$ enables the position of the shaft $t'$ to be altered as required by turning the ring $R^2$ by means of the worm S, the turning power being transmitted by the springs. The rudder-head $t$, which is rigidly secured to the rudder-blade D at H, is mounted in a tube T, which is fixed on the end of the driving-shaft A about at right angles thereto and serves also as a bearing for the eye $d$ of the rudder-blade D, and whose upper end is in the example provided with a boss $t^2$, recessed to receive the joint $u$ and to allow of its movement due to the oscillation of the tube T, and also of that caused by the partial rotation of the shaft $t'$, when the rudder-blade is being simultaneously used for steering. The rudder-blade is preferably laminated, so as to impart to it elasticity, which has been found to increase its efficiency. The partial rotation of the shafts $t'$ and $t$ is simultaneous, although not with the same angular velocity, when the rudder-blade is simultaneously used for driving and steering. By means of the joint $u$ the angular velocity can be varied a little from $t$ to $t'$, and vice versa, as may be desired.

It will be seen that if the ring $R^2$ be fixed so that the springs $R'$ have a tendency to keep the plane of the rudder D in or to restore it to a direct fore-and-aft position and the shaft A be rocked the rudder-blade D will be oscillated about the axis of the shaft A and also about the axis of the rudder-head $t$, the latter motion being due to the pressure of the water against the rudder-blade. The oscillation of the tube T with the rudder-blade should be similar to that of a pendulum, its speed varying gradually from zero when most to one side of the vessel, through a maximum when vertical, to zero when most to the other side of the vessel, and vice versa, so that when the vessel is moving straight ahead the position of the blade D may, under the combined action of the springs and the water, vary gradually from being directly fore and aft when farthest apart and farthest astarboard to being most inclined to a directly fore-and-aft position (in one direction or the other, according to the direction of motion of the tube T) when the tube T is vertical, so that the springs $R'$ are then at their greatest tension and have accumulated a certain amount of energy, which returns the blade to its directly fore-and-aft position during the remainder of its semi-oscillation about the axis of the shaft A. Experiments indicate that the rudder-blade should not make an angle greater than forty-five degrees with a directly fore-and-aft position when the tube T is vertical. The amplitude of oscillation of the tube T may be eighty degrees. By turning the shaft $t'$ by means of the ring $R^2$ through angles up to ninety degrees in one or the other direction the vessel can be turned to port or to starboard, as desired, since the rudder-blade will be more perpendicular to its direction of motion, and will consequently act more forcibly on the water when moving in one half-oscillation than in the next, while by turning the shaft $t'$ through one hundred and eighty degrees the motion of the vessel can be reversed. The desired oscillation can be imparted to the shaft A by any suitable means—for example, an arm projecting therefrom may be jointed to the piston-rod of an oscillatory steam-cylinder. Instead of steel springs such as hereinbefore described pneumatic springs may be employed.

Figs. 5 and 5ª show an example of a steering and maneuvering device provided with pneumatic springs, each of which comprises a cylinder $R^4$ and a piston $R^5$ fitting therein, the cylinder and the piston-rod being respectively provided with eyes fitting on pivots $F'$, projecting upward from a wheel R, and a toothed ring $R^2$. To enable cylinders $R^5$ of small diameter to suffice, the space therein between their inner ends and their pistons is filled with air at a considerable pressure, which may be maintained by means of a small pump. It will be obvious that a full wheel placed above the disk R and having downwardly-projecting pins $F'$ could be used in lieu of the ring $R^2$.

For the purpose of convenience and brevity in the claims the shaft $t'$ will be termed a "maneuvering-shaft" and the shaft $t$ a "rudder-shaft."

What I claim is—

1. In apparatus for propelling, steering, and maneuvering a navigable vessel, the combination of a driving-shaft, a rudder, an arm by means of which the said shaft can oscillate the said rudder and about the axis of which the said rudder can be oscillated, a steering and maneuvering device, a maneuvering-shaft for connecting the said device with the said rudder, an elastic connection between the said maneuvering-shaft and the said device and adapted to limit the oscillation of the said maneuvering-shaft in both senses, and a connection comprising a universal joint between the said maneuvering-shaft and the said rudder.

2. In an apparatus for propelling, steering, and maneuvering a navigable vessel, the combination of a driving-shaft, a tubular arm fixed to the said shaft, a rudder-blade mounted on said arm to oscillate about the axis thereof, a rudder-shaft fixed to said rudder-blade and extending through the said arm, a steering and maneuvering device, a maneuvering-shaft connecting the said device with the said rudder-blade, an elastic connection between said maneuvering-shaft and the said device and adapted to limit the oscillation of the said maneuvering-shaft in both senses, and a universal joint connecting said rudder and maneuvering shafts.

3. In an apparatus for propelling, steering and maneuvering a navigable vessel, the combination of a driving-shaft, a rudder, an arm by means of which the said shaft can oscillate the said rudder and about the axis of which the said rudder can be oscillated, a steering and maneuvering device, a maneuvering-shaft for connecting the said device with the said rudder, a connection comprising a universal joint between the said maneuvering-shaft and rudder, and yielding members extending from the top of the said maneuvering-shaft and connecting it with the said steering and maneuvering device.

4. In an apparatus for propelling, steering, and maneuvering a navigable vessel, the combination of an oscillating driving-shaft, a tubular arm fixed thereto, a rudder-blade mounted to oscillate thereon, a rudder-shaft rigidly fixed to the said rudder-blade and extending through the said arm, a maneuvering-shaft having a fixed axis, a universal joint between said rudder and maneuvering-shaft, a steering and maneuvering ring or wheel, radial springs pivotally connected to the said maneuvering-shaft and to the said steering and maneuvering ring or wheel, and means for rotating the said ring or wheel, and securing it in any position into which it may be turned, substantially as and for the purposes set forth.

HENRIC CHRISTIAN VOGT.

Witnesses:
G. J. VOGT,
J. C. JACOBSEN.